Aug. 6, 1929.  W. G. WILSON  1,723,593
GAS SHUT-OFF VALVE
Filed Dec. 22, 1926  3 Sheets-Sheet 1
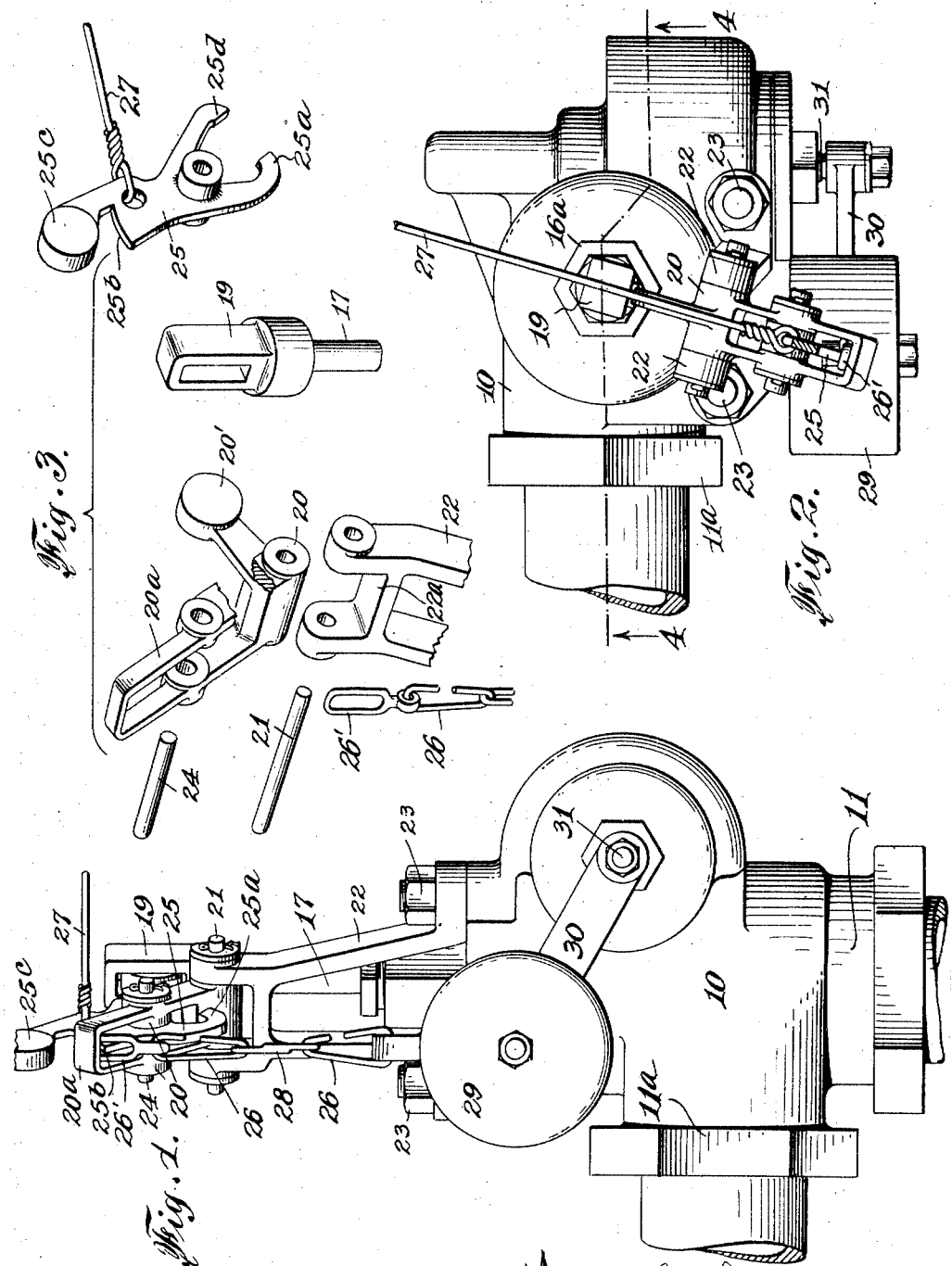

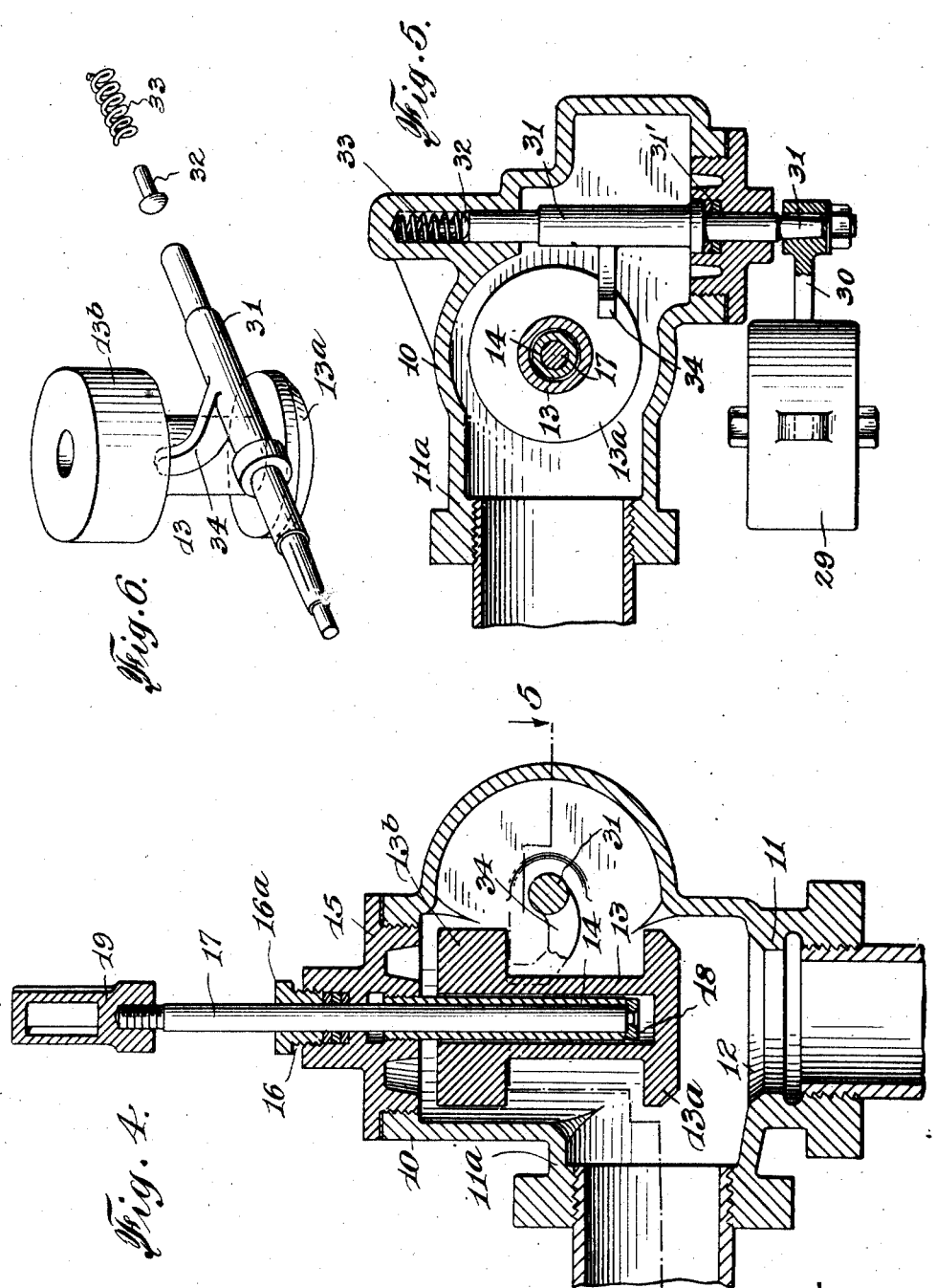

Aug. 6, 1929.  W. G. WILSON  1,723,593
GAS SHUT-OFF VALVE
Filed Dec. 22, 1926  3 Sheets-Sheet 3
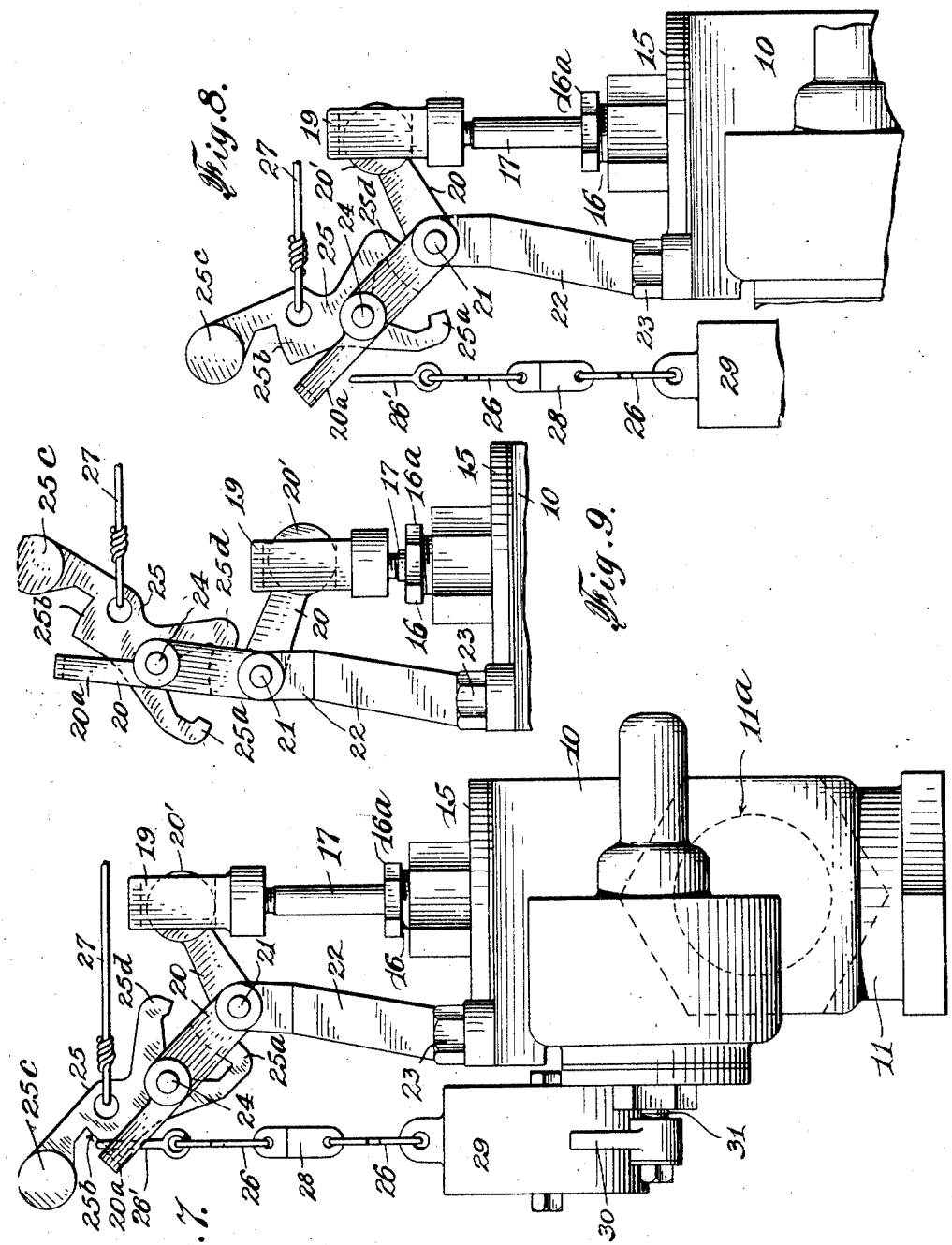

Patented Aug. 6, 1929.

1,723,593

UNITED STATES PATENT OFFICE.

WYLIE G. WILSON, OF ELIZABETH, NEW JERSEY, ASSIGNOR TO EVERLASTING VALVE COMPANY, OF JERSEY CITY, NEW JERSEY, A CORPORATION OF NEW JERSEY.

GAS-SHUT-OFF VALVE.

Application filed December 22, 1926. Serial No. 156,420.

This invention relates to valves, and more particularly aims to provide an improved type of fluid shut-off valve.

An object of the invention is to provide an improved fluid shut-off valve adapted to be installed in any fluid line, as a steam or gas line, and of the type which is normally open but which may be closed from any one of several remote points.

Another object is to provide a valve as just described which may thus be given a complete and dependable closure, without, on the one hand having to employ other than a very simple operative connection between such a remote point and the valve member, and without, on the other hand, having to bring the valve member to its seat with such impact shock as to injure the valve or endanger any of the pipe or fitting joints at or near the valve.

One of the objects of the present invention is to provide, particularly for use in gas supply lines for dwellings and other edifices, a fluid shut-off valve of the normally open type, which may be manually closed from a remote point as aforesaid, and which also will be automatically closed on the occurrence of a decided increase of temperature at a predetermined point more or less close to the valve casing, such as would arise incident to a fire. In this connection, it is explained that ordinances and departmental regulations for the protection of buildings and firemen against conflagration hazards, especially in the large cities, require that a gas shut-off valve be installed which is so constructed or equipped that the same may be closed by an arriving fireman without a close approach to the valve itself, to preclude the possibility of an explosion while the firemen are in the cellar of the building. A common requirement is that a connection, and generally a mechanical one, be provided between the valve, or a lock box at the exterior of the building, and from there be manually operable to close the valve once the cover or door of the box is opened. It should also be understood that in some cases the gas meter may be melted fairly soon, to release a stream of gas into the building, unless the shut-off valve is placed between the meter and the gas-main in the street. When the valve is so placed, it is generally if not always in rather an inaccessible location, increasing greatly the danger to a fireman who would have to make entry to the cellar to shut off the valve. Thus, it is vitally important that a remotely controlled valve closing means be provided. I am aware that heretofore gas shut-off valves have been designed which were constructed and equipped for such remote control, and for closhre from the exterior of the building.

A particular object of the present invention is to provide a gas shut-off valve capable of thus being closed, but one wherein at least two disadvantages of previous valves of this kind are not present. One of these disadvantages has been due to the fact that closing of the valve has been relied on to follow merely from the falling of a weight or the releasing of a spring at the valve. As a result, complete and dependable valve closure could not be depended on. In the first place, a considerable force has had to be released at the valve, as by the use of a spring of considerable power, or by the dropping of a very heavy weight. This has been necessary, to overcome the possible resistance of the adjustable stuffing box; and, for safety sake, the magnitude of the weight, to take a weight-operated valve as an example, has always been too great rather than too small. Consequently with the stuffing box adjusted in such manner that no gas leak could occur normally, seating of the valve member has always been accompanied by a considerable impact shock. Such a shock of course occurs at a moment when it is particularly essential that no leakage at the joints be produced. Even so, the action of the valve has been by no means certain; sometimes a careless adjuster has screwed up the stuffing gox gland too tight. The other of the disadvantages referred to has been due to the fact that no means was provided to close, or "check" the closing of the valve member, as by applying a positive pressure thereto, in addition to the pull of gravity, to hold the valve member securely jammed down in its position of perfect seating.

Thus, it is a particular object of the invention to provide a gas shut-off valve so constructed and arranged that regardless of stuffing box adjustment a fireman at the lock box or other exterior station may close the valve and hold it closed by positive pressure.

Also, it is a particular object of the invention to provide a gas shut-off valve as last described, wherein a power-delivering or power-storing means is incorporated, as a weight, for operation during or incident to valve closure, but without accompanying such valve closure with detrimental impact shock.

The present invention has in view, also, various other objects, for instance:

A further object is to provide a gas shut-off valve of the remote control type, wherein also automatic valve closing means such as a weight is incorporated such that if the fire be in the cellar, the attainment of a predetermined temperature in the vicinity of the valve casing will cause the actuation of said weight without detrimental impact shock, thus to close the valve securely yet safely even before the arrival of a fireman.

Still a further object is to provide a gas shut-off valve as last described, and one so constructed and arranged that on the arrival of a fireman he may, immediately on obtaining access to the lock box or the like, and regardless of whether or not the automatic or temperature-responsive means has functioned, operate a valve closing means or member in such manner that if said automatic means has functioned the valve closure will be certified or made more secure, and if said automatic means has not yet functioned, the valve closure will be initiated and completed, also without detrimental impact shock. Incidentally, I achieve the very desirable result that the valve may be periodically tested without destroying or removing or interfering with the heat-responsive means—even though the test be conducted by actuating the manually operating means from a remote point.

Another object is to provide a gas shut-off valve for satisfying some or all of the foregoing objects, which shall be simple and reliable in construction and operation, which shall be fairly inexpensive to construct, which shall be so shaped interiorly as to be self-draining so far as condensates or other liquids are concerned, and which shall be very compact, so that the valve itself may be installed in a locked metallic box as required by some fire regulations, without requiring that box to be of unwieldy or objectionable size.

Various other objects and advantages of the invention will be specifically pointed out or apparent hereinafter, in the course of a description of a preferred one of the various possible forms of the invention as shown in the accompanying drawing; it being understood, of course, that such form is merely illustrative of one combination and arrangement of parts calculated to attain the objects of the invention, pursuant to present preference, and hence the detailed description of such form now to be given is not to be taken as at all defining or limiting the invention itself. That is to say, the scope of protection contemplated is to be taken solely from the appended claims, interpreted as broadly as is consistent with the prior art, and with explanatory references to the specification only where a claim is ambiguous or to be impliedly limited beyond its express terms to avoid such art in order to save the validity of said claim.

In the accompanying drawings:

Fig. 1 is a side elevation of a form of valve pursuant to the invention;

Fig. 2 is a top plan view of the same;

Fig. 3 shows, disassembled, the elements shown in perspective in Fig. 1;

Fig. 4 is a vertical sectional view, taken on the line 4—4 of Fig. 2;

Fig. 5 is a horizontal section, taken on line 5—5 of Fig. 4;

Fig. 6 is a perspective view showing certain of the parts of Figs. 4 and 5, partially disassembled;

Fig. 7 is an elevational view, looking toward the right side of the valve as shown in Fig. 1, and disclosing in side elevation the parts seen in perspective in Fig. 1;

Fig. 8 shows certain of the last mentioned parts as seen in Fig. 7 but in different relative positions; and Fig. 9 is a view similar to Fig. 8, showing said parts in still different relative positions.

Similar reference characters refer to similar parts throughout the several views of the drawings.

The form of valve illustrated is one especially designed for a gas-supply line to a building; and the valve includes, as a part of a casing 10, a throat 11 at its bottom, which in the present case is a gas inlet. As shown in Fig. 4, a valve seat 12 surrounds the upper end of said inlet, and a valve disc 13$^a$, forming the lower portion of a more or less spool-shaped weight-member 13, is normally elevated above said seat, so that normally the valve is in open condition. The weight-member 13 is so very light, that when dropped to the seat 12, there is practically no impact shock. In practice, the member 13 is given a weight of only two pounds, with a seating drop of two inches.

This weight member may be made so light, because gravity is relied on only to drop the valve the slight distance mentioned and to press the valve against its seat sufficiently to prevent the gas pressure (which is but slight) from lifting the valve off its seat. In other words, the weight member 13, in dropping, does not have to overcome stuffing box resistance, or any other normal resistance aside from that of the incoming gas stream; the hollow portion of the member being rather loose about a tubular guide sleeve 14 screwed into cap 15 of the casing.

The only stuffing box present is that indicated at 16. Through the small gland 16$^a$ there passes a slide-rod or plunger 17; the lower portion of this plunger, above the disc 18 at its lower end, being slidably accommodated within the guide-sleeve 14.

The upper end of the plunger carries a stirrup-member 19 forming one element of what is in effect a pivotal connection between the plunger and a bell-crank lever 20 shown most clearly in Fig. 3; the other element of said connection being a terminal disk-enlargement 20' carried by the shorter arm of said lever.

Comparing Figs. 1, 2 and 3, with Fig. 7, lever 20 is pivoted on a pin 21 at the upper end 22ª of standard 22, bolted at its bottom to the main body of the casing 10 as indicated at 23 in Figs. 1 and 2. The frame-shaped upper arm 20ª of the lever 20 is provided intermediate its ends with a pin 24 on which is loosely pivoted a double-claw rocker, which may be termed the trigger, 25.

With bell-crank lever 20 arranged as shown in Fig. 7, that is, to hold the plunger 17 elevated as required while the valve is in its normal open condition, the trigger may be set to its normal position on the bell-crank lever, that is, to have its claw 25ª abut the under-surface of the upper arm of the lever, as shown in Fig. 7. Then, the curved upper surface 25ᵇ of the trigger is arranged overlappingly of the upper end of said upper arm of the lever in such manner that, if the uppermost link 26' of a chain 26 be engaged with said surface as shown in Fig. 7, the chain will be suspended from said surface without chance of accidental detachment therefrom.

In order to prevent such accidental detachment, the trigger carries a weight portion as indicated at 25ᶜ; so disposed that with the parts arranged as shown in Fig. 7 the weight, although fairly inconsiderable in itself, lies some distance to one side of the pin 24 on which the trigger is pivoted. Thereby, another object of the invention is simply attained, which is to prevent accidental release of the chain 26 when the valve is subjected to a fairly strong vibration. The same result may of course be otherwise attained; even in the case of the trigger device now being described. For instance, the small weight 25ᶜ could be dispensed with, and instead the curved surface 25ᵇ of the trigger could be notched or recessed slightly at the point where engaged by the link 26' of the chain.

A cable or wire 27 extends from the trigger to a point remote from the valve, say to the interior of the lock box (not shown) at the exterior of the building.

Chain 26, including somewhere along its length a fusible link 28, engages at its lower end an auxiliary weight 29, and normally holds such weight elevated as shown in all the views—except Fig. 8, where the weight has started to drop.

This weight is carried at the free swinging end of an arm 30, which arm is bolted, as shown most clearly in Fig. 5, on one end of a horizontal stem 31 passing through the interior of the valve casing and held against an asbestos packing washer 31' by the endwise thrust of a small headed stud 32 acted on by an expansile coil spring 33 as shown best in Fig. 5.

As will be seen from Figs. 4, 5 and 6, this stem 31 has a finger 34 offset therefrom, at a point along the length of the stem to cause the finger to lie under the upper enlarged head 13ᵇ of the main weight 13, and hold said weight elevated while the auxiliary weight 29 is held up by the chain 26. There is nothing analogous to the usual stuffing box resistance to a rotation of the stem 31, to permit valve closure, and a rotation of the stem when the auxiliary weight 29 is released is totally unaccompanied by any impact shock.

Normally the parts just described are arranged as shown in Figs. 4, 5 and 6. Then the bell-crank 20 and trigger 25 of Figs. 7, 8 and 9 are in the relative dispositions shown in Fig. 7.

*Closing operation.*

On the occurrence of a fire in premises equipped with the new valve, an arriving fireman pulls the cable 27, say from the lock box at the exterior of the building.

The first thing that happens is that the trigger 25 becomes redisposed on the bell-crank lever 20 as shown in Fig. 8. This releases the chain 26, and the auxiliary weight 29 rocks the stem 31 in a counter-clockwise direction as seen in Fig. 4. This movement of the stem similarly swings the finger 34, and the main weight 13 drops to seat the valve-disc 13ª. If the link 28 has meanwhile fused, said main weight has already dropped to seat the valve disc; but the trigger movement just described will do no harm. The valve, in either event, is closed, absolutely, and without detrimental impact shock. The valve thus closes each time the lower end of chain 26 is permitted to descend, whether by action of the automatic means including the fusible link 28, or by manual rocking of the trigger 25.

The next thing that happens, as the result of the fireman's pull on the cable 27, is that, following the impingement of the claw 25ᵈ of the trigger against the upper arm of the bell-crank lever 20 (see Fig. 8), said lever becomes redisposed on the standard 22 as shown in Fig. 9. This drives down the plunger 17, to force the bottom of the same as hard as desired against the bottom wall of the central hollow in the main weight 13 (Fig. 4), to "check" or certify the gravity seating of the valve disc 13ª, to center the latter if necessary on its seat 12, and to impose positive seat-holding pressure against the valve member.

The new valve is self-draining, is very compact, and meets all the requirements hereinabove noted, particularly so far as a gas shut-off valve is concerned; also, the valve may be periodically tested without destroying or disengaging the fusible link.

The invention, however, is not to be limited to a fluid valve for gas. For instance, the invention may be embodied in a steam shut-off valve, with practically no changes; except that it might be desirable to employ the throat 11ª as the fluid inlet. A shut-off valve according to the invention would be especially useful in steam lines. Such an embodiment of the invention, particularly, might advantageously be equipped with electric conductors as the connections between push-buttons at the various desired points of remote control and the means local to the valve casing for directly bringing about valve closure.

Inasmuch as various other changes could be made in the above construction, and many apparently widely different embodiments of the invention could be made without departing from the scope thereof, it is intended that all matter contained in the above description or shown in the accompanying drawings shall be interposed as illustrative and not in a limiting sense.

It is also to be understood that the language contained in the following claims is intended to cover all the generic and specific features of the invention herein described and all statements of the scope of the invention which, as a matter of language, might be said to fall therebetween.

I claim:

1. A fluid shut-off valve comprising a casing having a port, a valve member movable to close said port, a detent for normally holding the valve member in open position, a rod slidably extending through a wall of the casing and adapted to exert pressure on the valve, a lever mounted without the casing and operatively engaging one end of the rod, and means for causing movement of the detent to release the valve and permit it to close when the lever is rocked to move the rod in the valve-closing direction.

2. A fluid shut-off valve comprising a casing having a port, a valve member movable to close said port, an operating member extending through the wall of the casing, said operating member being capable of manual operation to press the valve toward the port, a second operating member located entirely within the casing and adapted to close the valve independently of the first-named operating member, said second operating member having no positive connection with any member outside the casing, and a detent for normally holding the valve in open position and said second operating member inoperative.

3. A fluid-shut-off valve comprising a casing having a port, a valve member movable to close said port, an operating member extending through the wall of the casing, said operating member being capable of manual operation to press the valve toward the port, gravity-operated means within the casing and adapted to close the valve independently of the first-named operating member, and a detent for normally holding the valve in open position and the valve closing gravity operated means inoperative.

4. A fluid shut-off valve comprising a casing having a port, a valve member movable to close said port, an operating member extending through the wall of the casing, said operating member being capable of manual operation to press the valve toward the port, gravity-operated means within the casing and adapted to close the valve independently of the first-named operating member, a detent for normally holding the valve in open position and the valve closing gravity operated means inoperative, and gravity-operated means normally held inoperative for releasing the detent.

5. In a fluid shut-off valve, the combination of a casing having a port, a valve member movable to close said port, a member for applying pressure to said valve member to move the latter to close the port, a normally restrained weight member which when thus restrained acts to prevent closing of the port by the valve member, a valve closing means including a latch, and means for releasing said weight member also including said latch, said valve closing means being operable in one direction first to operate said latch relative to the releasing means and then to operate the pressure member.

6. In a fluid shut-off valve, the combination of a casing having a port, a valve member movable to close said port, a member for applying pressure to said valve member to move the latter to close the port, the said valve member being a floatably guided weight normally held elevated above said seat, a normally restrained power-delivering means for releasing said valve member to drop to close the valve, automatic means for removing the restraint from said power-delivering means, and manual means for operating said pressure member and also for removing said restraint if not already removed by previous operation of said automatic means.

7. In a fluid shut-off valve, the combination of a casing having a port, a valve member movable to close said port by gravity, means for normally holding said valve member in open position relative to the port, a normally inoperative power-delivering means for releasing said holding means, and means for rendering operative said power-delivering means, the means last mentioned including both an automatic control member functioning upon a change of temperature at a point exterior to the casing, and a manual actuator, and there being further provided a means operated also by said manual actuator for causing the valve member to close the port independently of the gravity action of said valve member.

8. In a fluid shut-off valve, the combination of a casing having a port, a valve member movable to close said port by gravity, means for normally holding said valve member in open position relative to the port, a normally inoperative power-delivering means for releasing said holding means, and means for rendering operative said power-delivering means, the means last mentioned including a member controlled by a change of temperature at a point exterior to the casing, there being also provided a means operable manually from a remote point for rendering operative said power delivering means for releasing said holding means on failure of said temperature controlled member to function and for positively subjecting the valve member when closed to mechanical pressure to hold the same closed.

9. In a fluid shut-off valve, a floating valve member seatable by gravity to close the valve, a detent normally holding the valve member elevated above its valve closing position, a device for moving the detent to release the valve member, and means holding said device inoperative and including a fusible element.

10. In a fluid shut-off valve, a gravity closable valve member, a detent normally holding the valve member elevated above its valve closing position, normally inoperative means for exerting a positive downward pressure on the valve member to urge the latter toward and hold the same in valve closing position, and means operative to cause movement of said detent to release said valve member and to actuate said pressure means.

11. In a fluid shut-off valve, a casing including a port, a valve closing means in the casing including a valve so mounted and supported as always to tend to seek valve closing position, restraining means for normally overcoming such tendency, means operable to apply a positive seating pressure to the valve member when the latter is in valve closing position, and means operable first to render ineffective said restraining means and then to operate the positive pressure means.

12. In a fluid shut-off valve, a casing including a port, a valve closing means in the casing including a valve so mounted and supported as always to tend to seek valve closing position, restraining means for normally overcoming such tendency, means operable to apply a positive seating pressure to the valve, and valve closing means including an endwisely movable device adapted to run from near the valve casing to a point of remote manual control, a pivoted member connected to the positive pressure means, and an endwisely movable device including a fusible element, the last mentioned device being normally connected to said pivoted member and the latter being connected to said first mentioned device, whereby on endwisely moving said first named device, if said element is not fused, the device including said element will be first disengaged from the pivoted member thereby to render ineffective said restraining means, and upon further movement of said first mentioned device the pivoted member will operate the positive pressure means.

13. In a fluid shut-off valve, a casing including a port, a valve member in the casing adapted to be closed by gravity, a shaft rotatably mounted in the casing, a detent carried by the shaft, a weight-member for operating the detent, and means including a fusible element exterior to the casing for positioning the weight and detent to hold the valve away from the port while said element is intact, there being also provided a means including a cable, chain or the like for releasing said weight and detent positioning means to permit the valve member to close regardless of the condition of said element.

14. In a fluid shut-off valve, a gravity closing valve member, a detent for normally holding the valve open, means for releasing the valve from the detent, a tubular guide for said valve member, a plunger working in said guide for thrusting against the valve member when closed by gravity, a bell-crank for thus thrusting the plunger, and a cable, chain, or the like for operating the bell crank.

15. In combination, a valve casing having a port, a valve member adapted to seal the port, a weight located within the casing for closing the valve, an exterior weight normally held in one position, means under control of the exterior weight for normally holding the valve in open position and the weight within the casing inoperative, a movable support for the exterior weight passing through a wall of the casing, a packing between said support and the casing, and means for releasing and causing movement of the exterior weight to release the interior weight, thereby permitting both weights to function while imposing all packing resistance on the exterior weight.

In testimony whereof I affix my signature.

WYLIE G. WILSON.